(12) United States Patent
Boundy et al.

(10) Patent No.: US 10,293,877 B2
(45) Date of Patent: May 21, 2019

(54) UNIVERSAL STEM-MOUNTED BICYCLE COMPUTER MOUNT

(71) Applicant: F3 Cycling LLC, Deer Park, IL (US)

(72) Inventors: Tim John Boundy, Deer Park, IL (US); Frank Pistorio, Itasca, IL (US)

(73) Assignee: F3 Cycling LLC, Deer Park, IL (US)

( * ) Notice: Subject to any disclaimer, the term of this patent is extended or adjusted under 35 U.S.C. 154(b) by 0 days.

(21) Appl. No.: 15/661,174

(22) Filed: Jul. 27, 2017

(65) Prior Publication Data
US 2018/0029658 A1    Feb. 1, 2018

(51) Int. Cl.
*B62J 11/00*    (2006.01)
*B62J 99/00*    (2009.01)

(52) U.S. Cl.
CPC .............. *B62J 99/00* (2013.01); *B62J 11/00* (2013.01); *B62J 2099/004* (2013.01); *B62J 2099/0013* (2013.01); *B62J 2099/0033* (2013.01)

(58) Field of Classification Search
CPC ........ B62J 2099/0006; B62J 2099/0013; B62J 2099/002; B62J 2099/0026; B62J 2099/0033; B62J 2099/004; B62J 11/00; B62J 99/00; B60R 2011/0294; B60R 2011/0241; Y10T 403/32975; Y10T 403/32983; Y10T 403/7171
USPC .......... 224/420, 412; 403/109.1, 109.8, 308, 403/358, 164–165, 396
See application file for complete search history.

(56) References Cited

U.S. PATENT DOCUMENTS

| | | | |
|---|---|---|---|
| 8,998,048 B1* | 4/2015 | Wu ........................ | B62J 11/00 224/420 |
| 2013/0098959 A1* | 4/2013 | Onogi .................... | B62J 11/00 224/419 |
| 2015/0183478 A1* | 7/2015 | Tate ....................... | B62J 11/00 224/441 |
| 2016/0052464 A1* | 2/2016 | Wadey ................... | B62J 11/00 224/553 |
| 2016/0272263 A1* | 9/2016 | Zeindl .................... | B62J 11/00 |

FOREIGN PATENT DOCUMENTS

DE    202015002018 U1    6/2016
TW    M527401 U    8/2016

OTHER PUBLICATIONS

PCT Notification of Transmittal of the International Search Report and the Written Opinion of the International Searching Authority, or the Declaration, dated Oct. 5, 2017, International Application No. PCT/US2017/044152, 12 pages.

* cited by examiner

*Primary Examiner* — Scott T McNurlen
(74) *Attorney, Agent, or Firm* — McAndrews, Held & Malloy, Ltd.

(57) ABSTRACT

The present disclosure describes an electronic device mount for a bicycle. The mount includes a pair of arms, wherein each arm is configured to receive a fastener. A cradle receives and retains the arms and each arm can rotate with respect to the cradle. An interface is connected to the cradle and is configured to be detachably connected to an electronic device. The arms are rotatable such that each arm aligns with a bore on a bicycle stem, and each arm is connected to the stem by securing the fasteners in the bores of the bicycle stem.

10 Claims, 15 Drawing Sheets

UNIVERSAL STEM-MOUNTED BICYCLE COMPUTER MOUNT

RELATED APPLICATIONS

This application is related to, and claims priority to, U.S. Provisional Application No. 62/367,461, filed Jul. 27, 2016, titled "Universal Stem Mounted Bicycle Computer Mount," the complete subject matter and contents of which are incorporated herein by reference in their entirety.

BACKGROUND OF THE INVENTION

Many cycling enthusiasts like to be able to use and see computerized or other electronic devices while riding their bicycles. For example, a rider may want to be able to access and see a GPS device (such as a Garmin™ or Wahoo™ device), a camera (such as a GoPro™ device), a smart phone or PDA or a light while riding his or her bike. Such computerized devices may be mounted to the bike at the handlebars or the stem. The stem is the portion of the bike that connects the handle bars to the body of the bike. The stem includes a faceplate and a body portion. The handlebars are located between the faceplate and body, and the faceplate and body are typically connected by an upper pair of bolts and a lower pair of bolts.

A cyclist mounts the computerized device to the handlebars or stem so that the he or she can see the device while riding. However, the shape and dimensions of stems and handlebars are not standard and tend to vary by component manufacturer. Therefore, a direct mount for a computerized device is typically specially made for a particular brand of stem and typically cannot be used on bikes made by different manufacturers. In addition, mounts (and the electronic devices to which they are connected) tend to be bulky and take up a significant amount of space on the handlebar, space that riders prefer to keep clean or use for attaching other things such as lights or bells. Existing mounts also are typically fixed in place once connected to a stem.

SUMMARY OF THE INVENTION

Certain aspects of the present technology provide an electronic device mount for a bicycle. The mount includes a pair of arms, wherein each arm is configured to receive a fastener, and a cradle that receives and retains the arms. Each arm can rotate with respect to the cradle. The mount further includes an interface connected to the cradle that is configured to be detachably connected to an electronic device. The arms are rotatable such that each arm aligns with a bore on a bicycle stem and each arm is connected to the stem by securing the fasteners in the bores of the bicycle stem.

Other aspects of the present technology include a pair of grooves in the cradle, wherein each groove receives a portion of one of the arms. In addition, each groove may have slots and each arm a rim, wherein the rim of each arm fits in a slot in the groove in which the arm is received. In other examples of the technology, the cradle includes a cradle bottom and a cradle top, wherein a portion of each arm is secured between the cradle bottom and the cradle top. Additionally, the cradle bottom and cradle top are detachably secured to each other by a fastener. In further examples, the cradle top has a first groove and a second groove, and the cradle bottom has a third groove and a fourth groove, wherein the first groove is aligned with the third groove and the second groove is aligned with the fourth groove and, when the cradle bottom and cradle top are secured to each other, a portion of one of the arms is rotatably secured in the first and third grooves and a portion of the other arm is rotatably secured in second and fourth grooves.

Still other aspects of the present technology include each arm having a first generally cylindrical portion and a second generally cylindrical portion that are offset from each other by an extension. Additionally, each second cylindrical portion includes a sleeve that receives a fastener. In another example of the technology, the mount includes a spacer that is configured to receive a fastener and be located between one of the arms and the stem. Other aspects include an insert, wherein the interface has a recess that receives the insert, and the insert is configured to be rotatably locked to an electronic device. In other examples, the cradle has a bottom connection portion that is configured to rotatably connect to a second electronic device.

Certain aspects of the present technology provide an electronic device mount for a bicycle that includes a pair of arms, wherein each arm is configured to receive a fastener, and a cradle that includes a pair of grooves, wherein each groove receives a portion of one of the arms and wherein each arm can rotate with respect to the cradle. The mount further includes an interface connected to the cradle that is configured to be detachably connected to an electronic device. The arms are rotatable such that each arm aligns with a bore on a bicycle stem, and each arm is connected to the stem by securing the fasteners in the bores of the bicycle stem.

Certain aspects of the present technology provide an electronic device mount for a bicycle that includes a pair of arms, wherein the each arm includes a first portion and a second portion that are offset from each other by an extension, and each second portion is configured to receive a fastener. The mount also includes a cradle that includes a pair of grooves, wherein each groove receives the first portion of one of the arms and wherein each of the arms can rotate with respect to the cradle. The mount further includes an interface connected to the cradle that is configured to be detachably connected to an electronic device. The arms are rotatable such that each arm aligns with a bore on a bicycle stem, and each arm is connected to the stem by securing the fasteners in the bores of the bicycle stem.

Figure 1A:
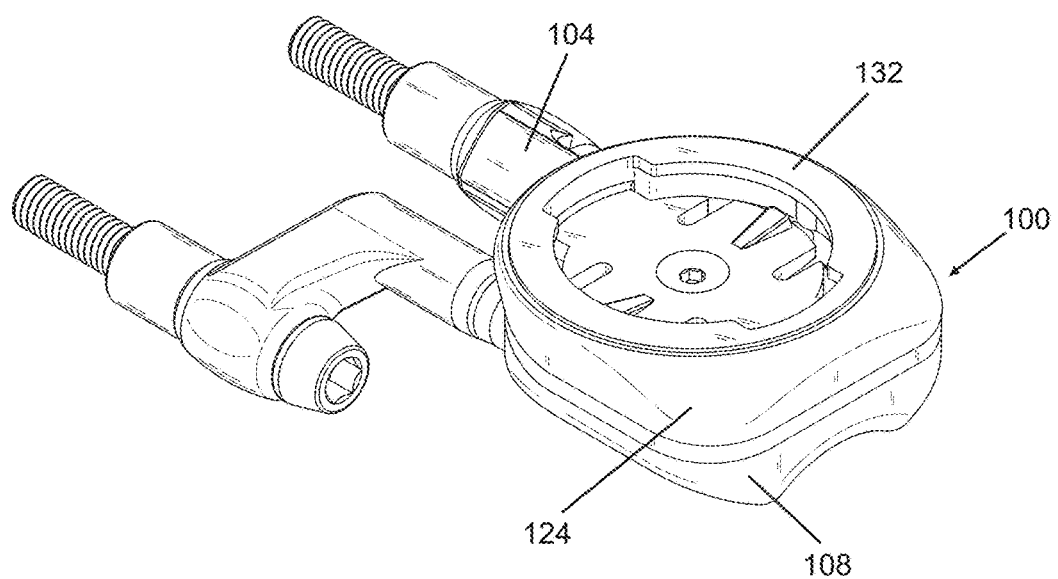
FIG. 1A is a top isometric view of a mount to the stem of a bicycle according to an embodiment of the present technology.
Figure 1B:
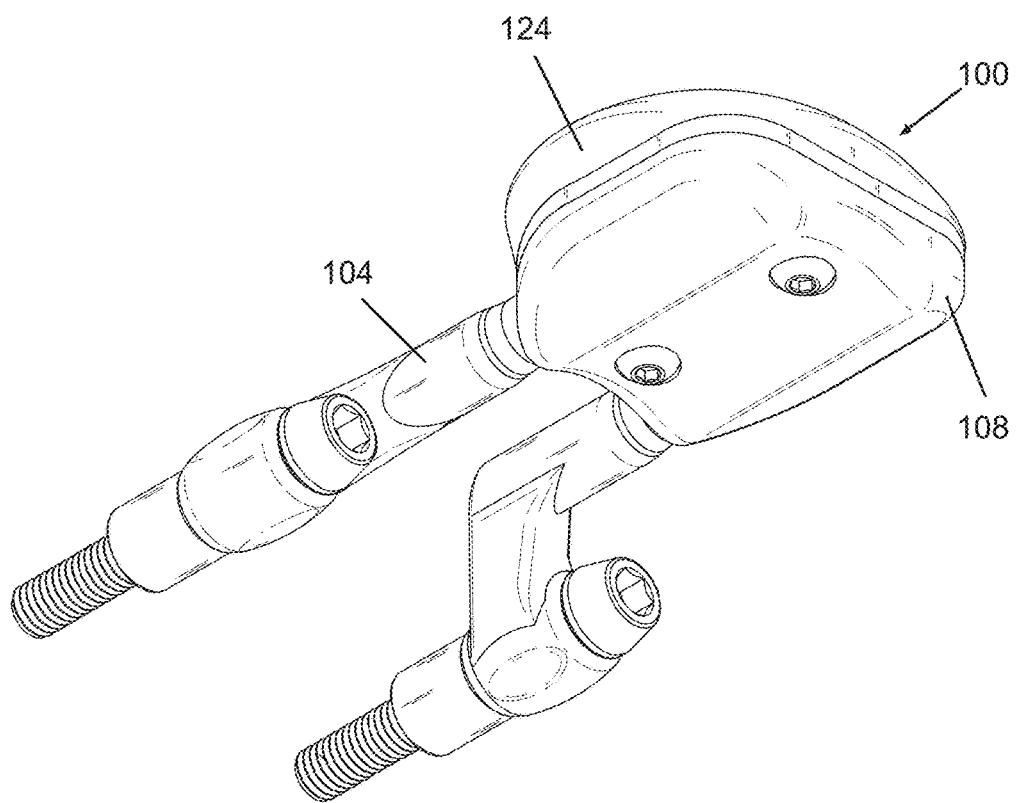
FIG. 1B is a bottom isometric view of the mount of FIG. 1A.
Figure 1C:
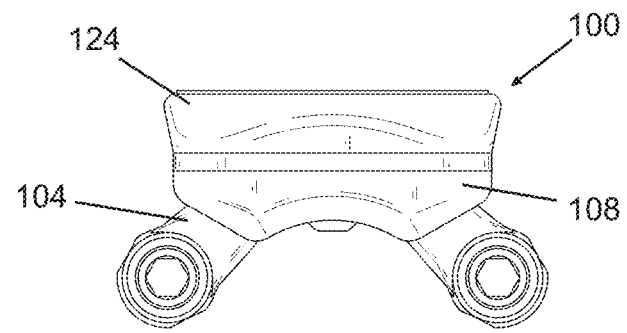
FIG. 1C is front view of the mount of FIG. 1A.
Figure 1D:
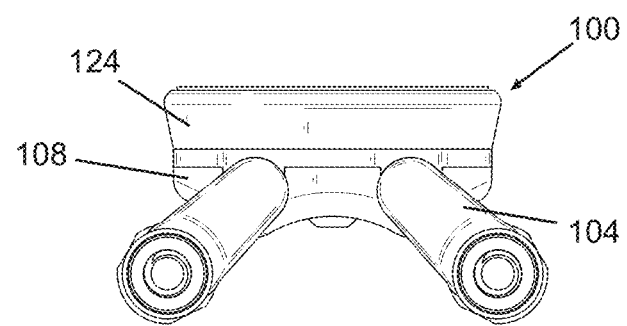
FIG. 1D is rear view of the mount of FIG. 1A.
Figure 1E:
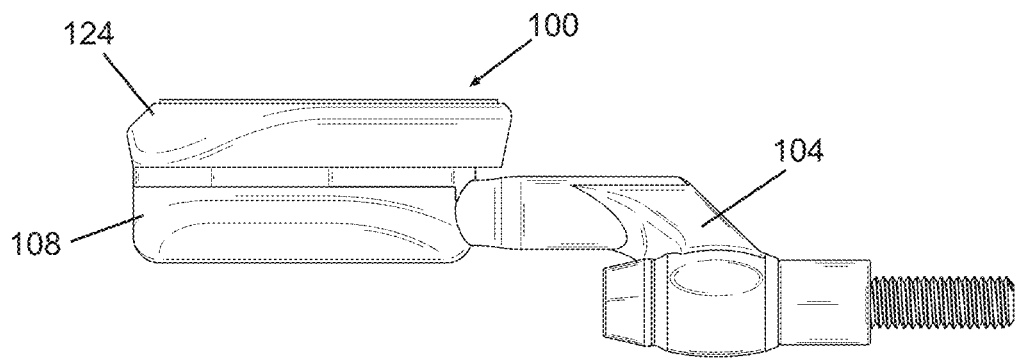
FIG. 1E is a side view of the mount of FIG. 1A.
Figure 1F:
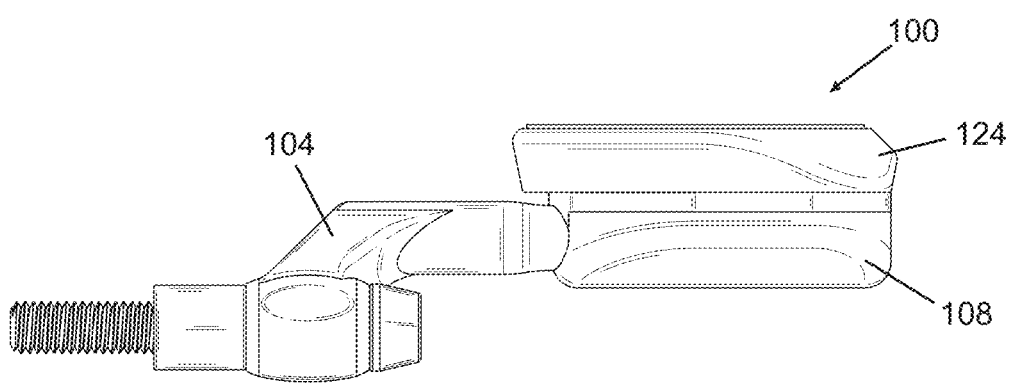
FIG. 1F is a side view of the mount of FIG. 1A.
Figure 1G:
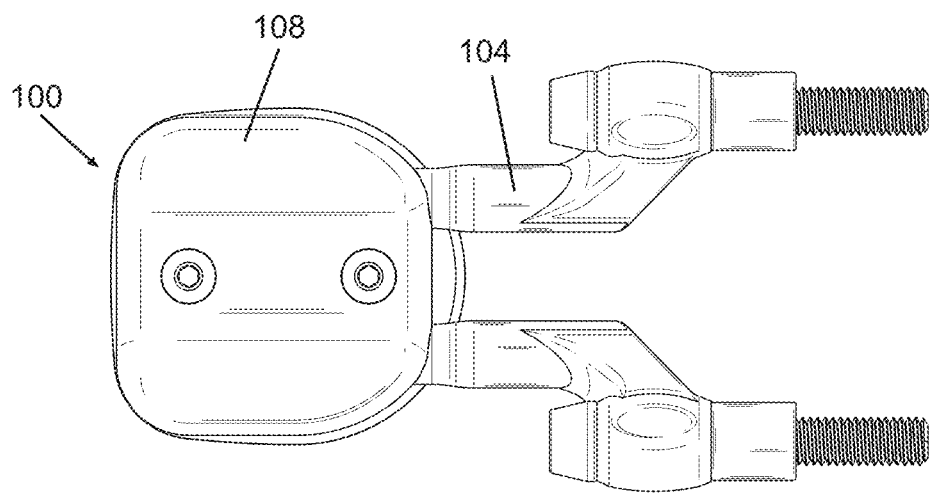
FIG. 1G is a top view of the mount of FIG. 1A.
Figure 1H:
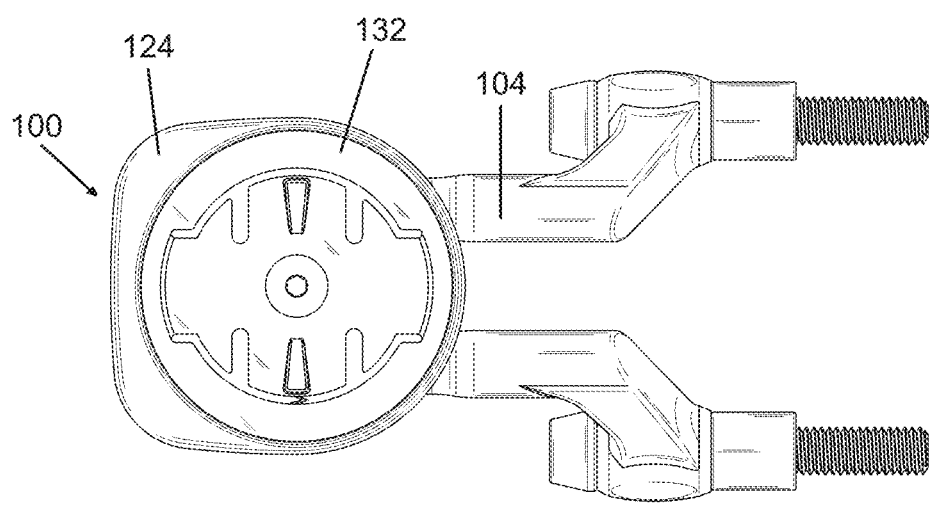
FIG. 1H is a bottom view of the mount of FIG. 1A.

The foregoing summary, as well as the following detailed description of certain aspects of the present technology, will be better understood when read in conjunction with the appended drawings. For the purpose of illustrating the present technology, there is shown in the drawings, certain examples and/or embodiments. It should be understood, however, that the present technology is not limited to the arrangements and instrumentality shown in the attached drawings.

DETAILED DESCRIPTION OF THE INVENTION

Figure 2:
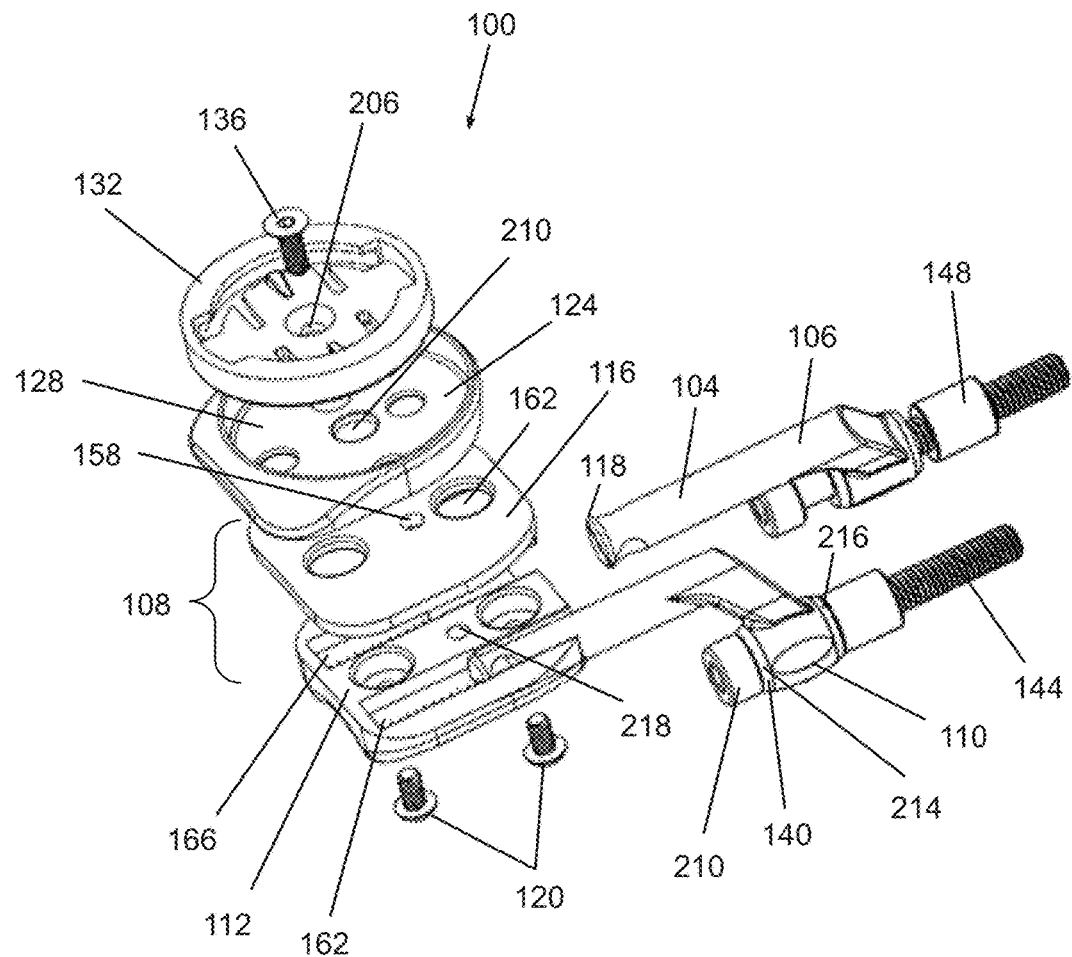
FIG. 2 is an isometric exploded view of the mount of FIGS. 1A-1H.
Figure 3:
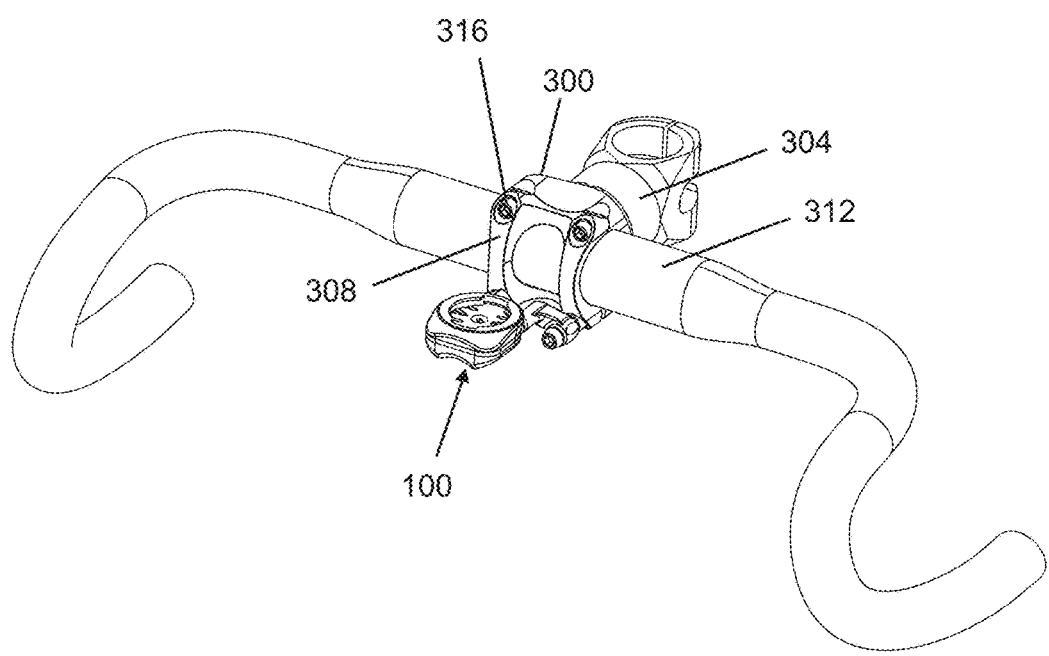
FIG. 3 is an isometric view of the mount of FIGS. 1A-1H connected to the stem of a bicycle.
Figure 4:
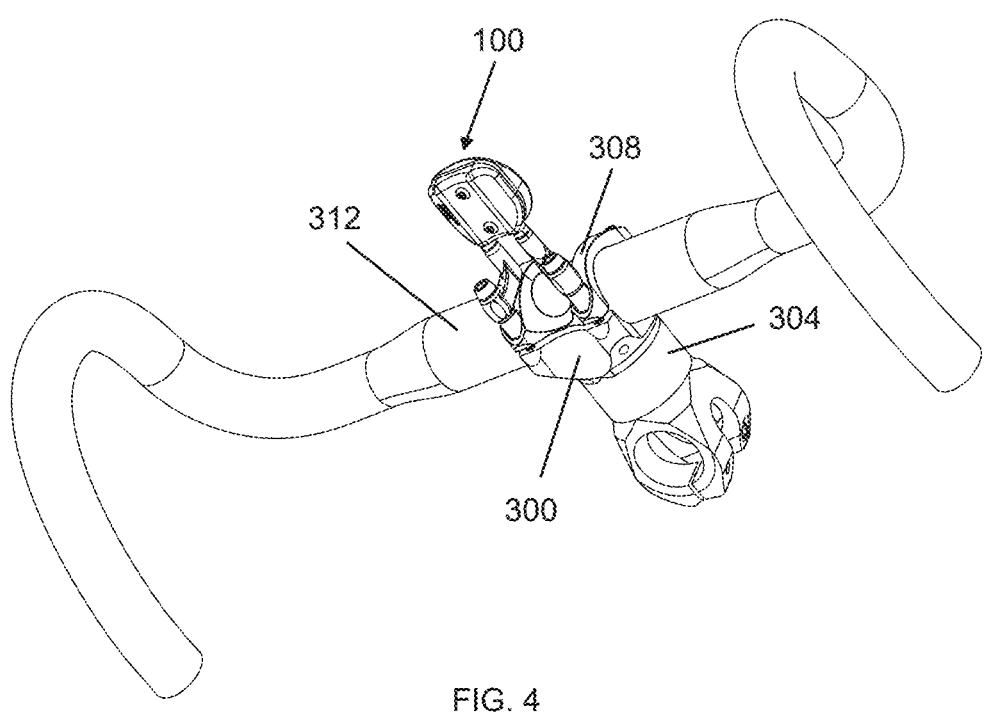
FIG. 4 is an isometric view of the mount of FIGS. 1A-1H connected to the stem of a bicycle.

The present invention relates to a mount for electronic devices that can be adjustably connected to a bicycle stem. FIGS. 1A-1H illustrate different views of the mount 100, and FIG. 2 illustrates an exploded isometric view of the mount 100. The mount 100 is configured to be attached to the stem of a bicycle. FIGS. 3 and 4 illustrate isometric views of the mount 100 connected to the stem 300 of a bicycle. The stem 300 has a body 304 and faceplate 308 between which is secured the handlebar 312 of a bicycle. The faceplate 308 is connected to the body 304 of by two sets of bolts 316, a top set of two bolts and a bottom set of two bolts. The mount 100 is connected to the stem 300 by removing one of the two sets of bolts 316 from the bicycle stem 300 and then using bolts to connect the mount 100 to the stem 300 at the bores from which the original set of bolts 316 was removed. FIGS. 3 and 4 show the mount 100 connected to the bores that retained the bottom set of bolt 316, but the mount 100 can also be connected to the bores that retain the top set of bolts 316. As shown in FIGS. 1A-1H and 2, and as described in more detail below, the mount 100 includes offset arms 104, a cradle 108 that includes a cradle bottom 112 and a cradle top 116, a top cap mount interface 124, and an interface insert 132 connected together by fasteners.

Figure 5:
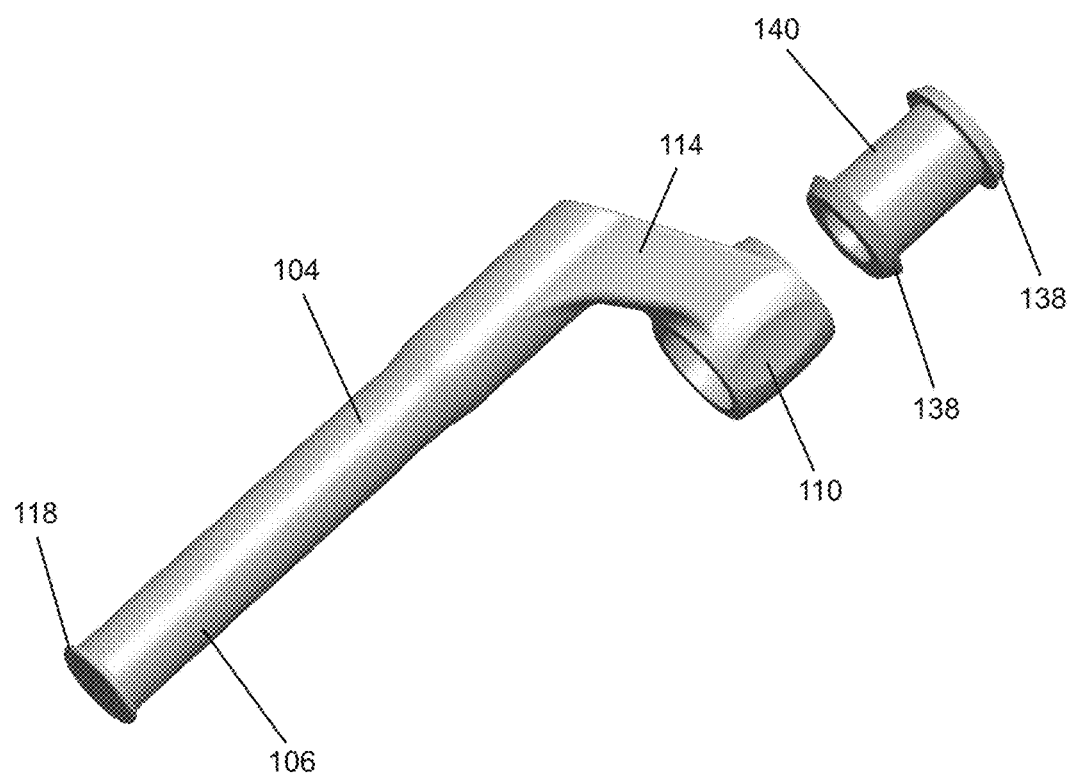
FIG. 5 is an isometric view of an arm of the mount of FIGS. 1A-1H.

Referring to FIGS. 2 and 5, the mount 100 includes offset arms 104 that are secured in a cradle 108. With respect to FIGS. 2 and 5, the offset arms 104 include first portions 106 that are generally cylindrical and that are connected to generally cylindrical second portions 110 by an offset extension 114. The first portions 106 are longer than the second portions 110. The first portions 106 have rims 118 at the ends opposite the extensions 114. Secured in the second portions 110 are cylindrical support sleeves 140. The offset arms 104 can be made of a hard material such as, by way of example, carbon filled nylon. Because the support sleeves 140 receive fasteners such as bolts, the sleeves 140 are made of a strong, durable material such as, by way of example, stainless steel. The offset arms 104 can be made by overmolding the second portions 110 with the sleeves 140 to retain the sleeves in the second cylinders 110. The sleeves 140 include rims 138 that help retain the sleeves 140 in the second portions 110.

The offset arms 104 also include spacers 148. The spacers 148 can be made of, for example, a hard plastic. The sleeves 140 and spacers 148 are configured to receive fasteners 144 such as bolts or screws that can be secured within two bores of a bicycle stem 300 (FIGS. 3 and 4). By way of example, the fasteners 144 can be 40 mm bolts. The fasteners 144 are configured to be used as a substitute for, and have the same length as, most kinds of factory bolts 316 (FIGS. 3 and 4) used with bicycle stems 300 when extending through the sleeves 140 and spacers 148. The arms 104 can vary in length depending on the application.

Figure 6:
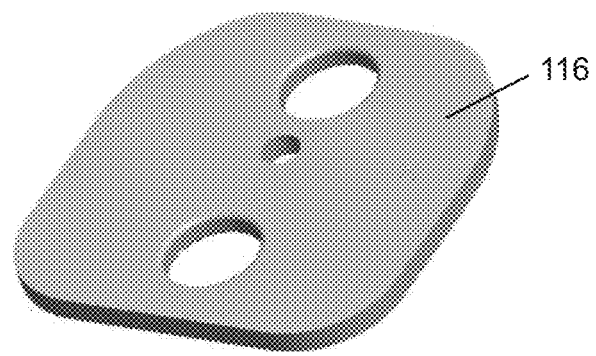
FIG. 6 is an isometric top view of a cradle top of the mount of FIGS. 1A-1H.
Figure 7:
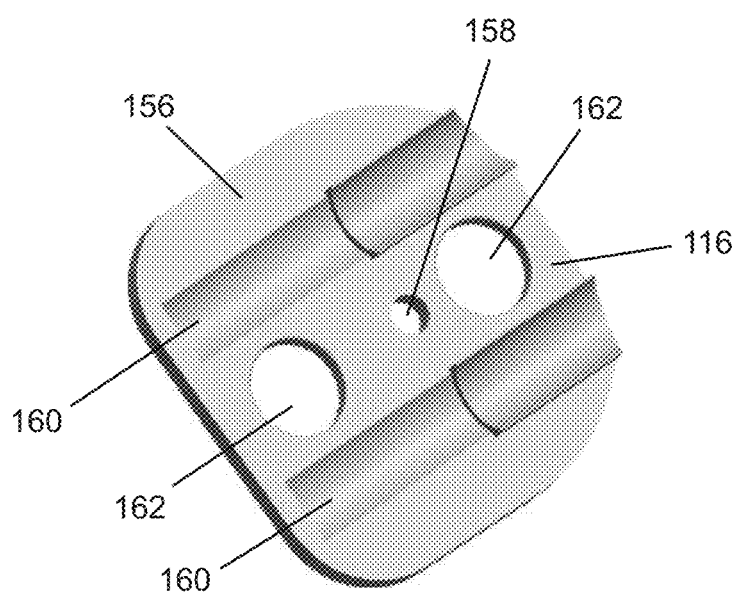
FIG. 7 is an isometric bottom view of a cradle top of FIG. 6.

With respect to FIG. 2, the cradle 108 includes a cradle bottom 112 and a cradle top 116, and the offset arms 104 are sandwiched in between the cradle bottom 112 and cradle top 116. With respect to FIGS. 6 and 7, the cradle top 116 is a generally flat plate with a hole 158 for receiving a fastener and holes 162 for receiving protrusions from the interface 124. The cradle top 116 may be made of a hard plastic material such as a resin. The bottom side 156 of the cradle top 116 includes shallow grooves 160 for receiving a top portion of the first cylindrical portions 106 of the offset arms 104 when the arms 104 are secured in the cradle 108. The cradle top 116 may be a variety of colors.

Figure 8:
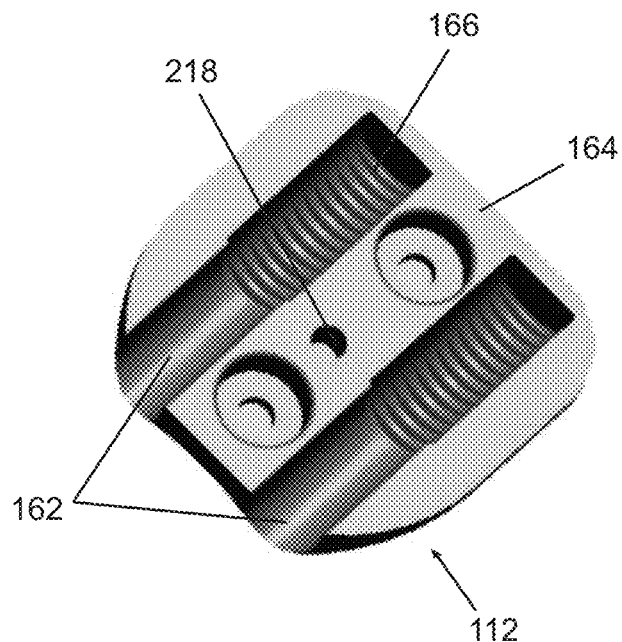
FIG. 8 is an isometric top view of a cradle bottom of the mount of FIGS. 1A-1H.
Figure 9:
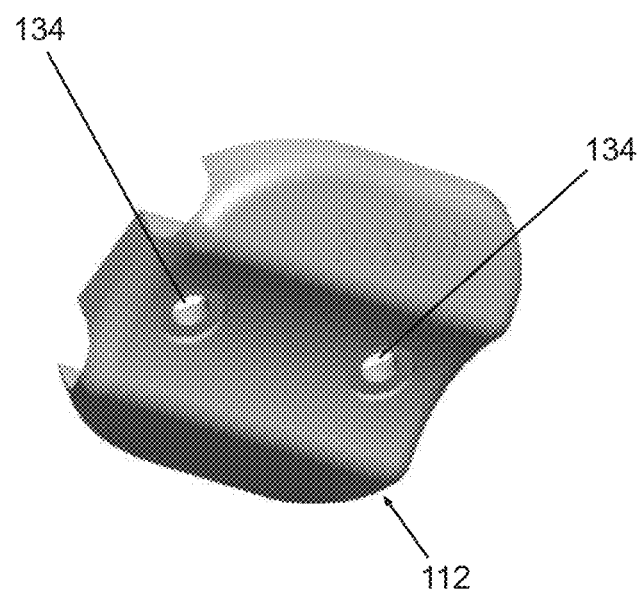
FIG. 9 is an isometric bottom view of the cradle bottom of FIG. 8.
Figure 10A:
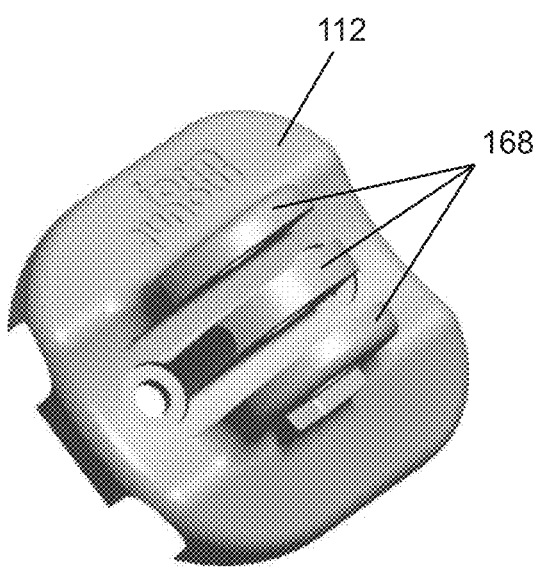
FIG. 10A is an isometric bottom view of another example of a cradle bottom.
Figure 10B:
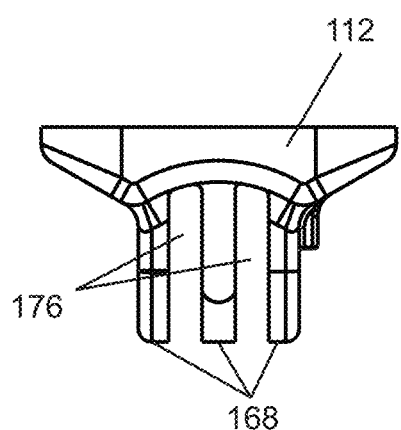
FIG. 10B is a front view of the cradle bottom of FIG. 10A.
Figure 10C:
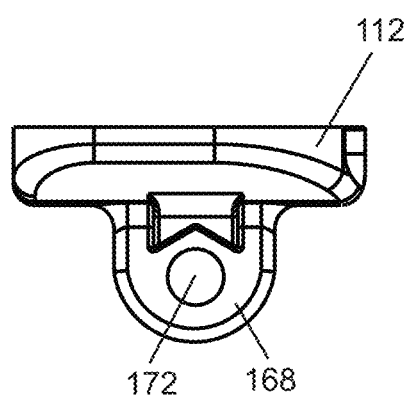
FIG. 10C is a side view of the cradle bottom of FIG. 10A.

With respect to FIGS. 8 and 9, the top side 164 of the cradle bottom 112 has grooves 162 to receive a bottom portion of the first cylindrical portions 106 of the offset arms 104 when the arms 104 are secured in the cradle 108. A portion of each groove 162 includes slots 166 configured to receive and retain the rims 118 of the offset arms 104 when the arms 104 are in the grooves 162. The cradle bottom 112 also has holes 134 to receive fasteners 120 and a threaded bore 218. As shown in FIG. 9, the bottom of the cradle bottom 112 can have a generally smooth contour that provides a short, space-saving profile. The cradle bottom 112 can be made of a hard material such as, by way of example only, carbon filled nylon. Alternatively, as shown in FIGS. 10A-C, the bottom of the cradle bottom 112 can have a mounting mechanism for other devices such as a camera. In particular, the bottom of the cradle bottom 112 can have tabs 168 that include holes 172 and that define slots 176. The slots 176 can receive complementary tabs of another device, such as complementary mount attached to a camera or light, and a pin or other fastener can be inserted into the holes 172 in the tabs 168 of the cradle bottom 112 and the mount of the other device such that the other device is rotatably mounted to the cradle bottom 112.

Returning to FIG. 2, the offset arms 104 can rotate within the grooves 116 and 162 when secured in the cradle 108. The cradle top 116 and cradle bottom 112 can be secured to each other (with the offset arms 104 in between) by the fasteners 120. By way of example only, bolts or screws 120 can be used to secure the cradle bottom 112 and cradle top 116 to each other and to the interface 124 as discussed in more detail below.

Figure 11:
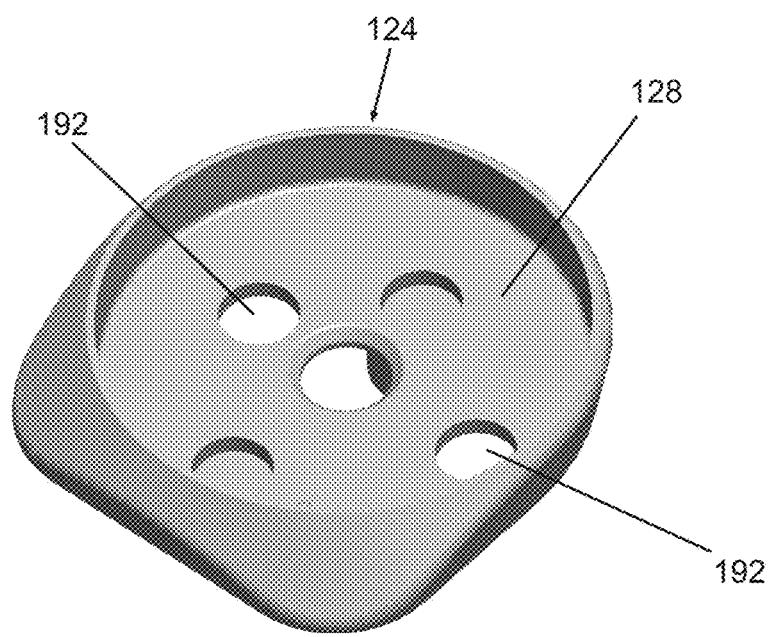
FIG. 11 is a top isometric view of an interface of the mount of FIGS. 1A-1H.
Figure 12:
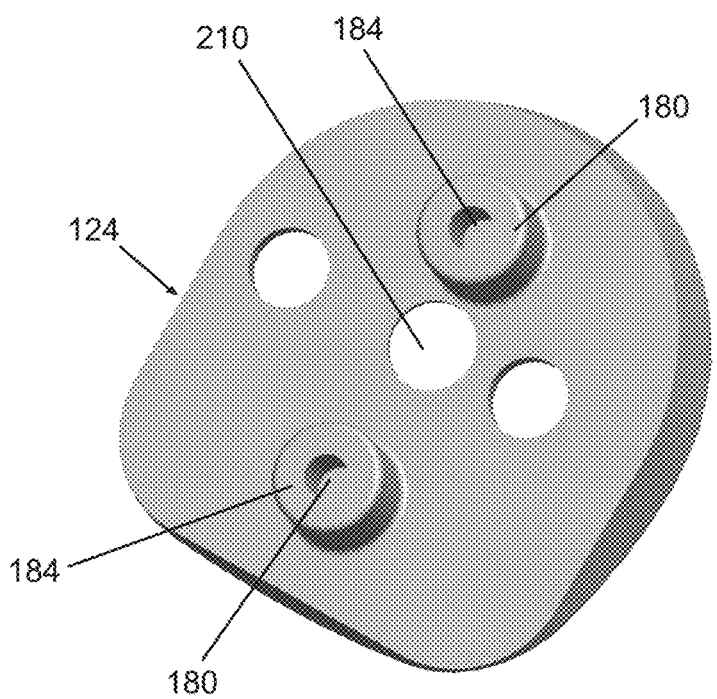
FIG. 12 is a bottom isometric view of the interface of FIG. 11.

With reference to FIGS. 2 and 11-12, the top cap mount interface 124 is configured to be mounted and secured to the top of the cradle top 116. The interface 124 defines a shallow, cylindrical interior region 128 that is configured to receive the interface insert 132. The bottom side of the interface 124 includes cylindrical protrusions 180 with bores 184. When the interface 124 is positioned on the cradle top 116, the protrusions 180 are positioned in the holes 162 of the cradle top 116. The bores 184 are configured to receive the fasteners 120 that connect the cradle bottom 112 and the cradle top 116. In this way, the interface 124, cradle bottom 112, and cradle top 116 can be secured to each other with the offset arms 104 positioned between the cradle top 116 and cradle bottom 112. Alternatively, the cradle bottom 112, cradle top 116, and interface 124 can be disassembled—allowing the offset arms 104 to be removed from the cradle 108—by removing the fasteners 120.

Figure 13:
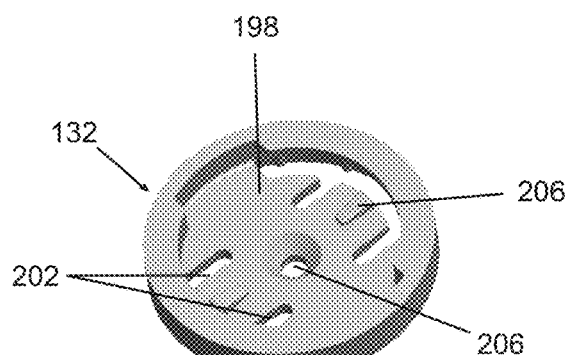
FIG. 13 is a top isometric view of an insert of the mount of FIGS. 1A-1H.
Figure 14:
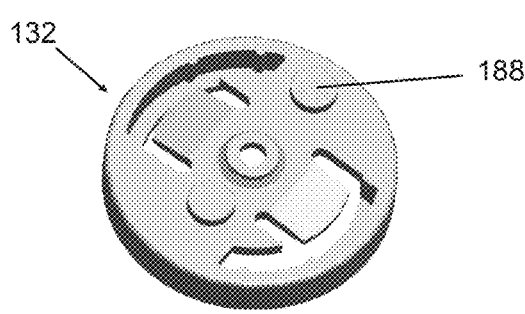
FIG. 14 is a bottom isometric view of the insert of FIG. 13.

With reference to FIGS. 2 and 13-14, the circular interface insert 132 is configured to be detachably connected to an electronic device, such as a GPS device, camera, phone, light, or other electronic device, e.g., a Garmin™, Wahoo™, or GoPro™ device. In particular, the insert 132 has a an interior region 198 that has slots 202 and tabs 206 that are configured to lockably interact with complementary mounting structures on a portable electronic device. Most portable electronic devices have male adapters that allow them to be detachably connected to a female adapter mount on another device, such as the interior region 198 of the insert 132. By way of example, an electronic device can be connected to the insert 132 by a twist-locking connection with the tabs 206 and slots 202. However, the insert 132 can be structured to be connected to electronic devices by a snapable connection or any number of other connection means or methods.

Figure 15:
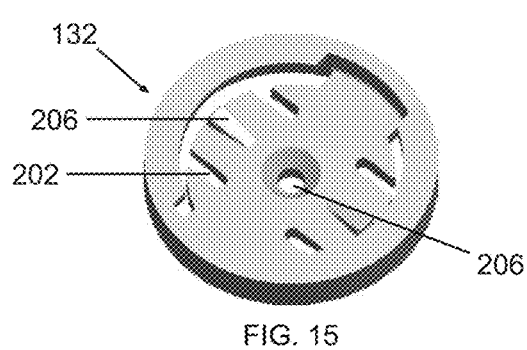
FIG. 15 is a top isometric view of another example of an insert.
Figure 16:
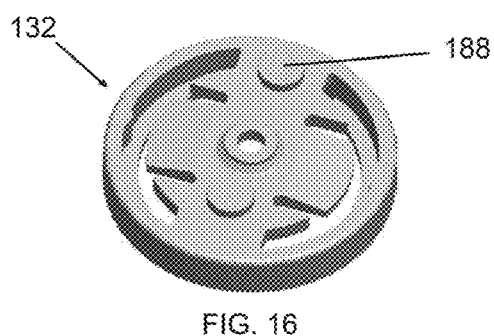
FIG. 16 is a bottom isometric view of the insert of FIG. 15.

The interface insert 132 is configured to be positioned in the interior region 128 of the interface 124. The insert 132 includes protrusions 188 on the bottom side thereof that dock into bores 192 (FIGS. 11 and 12) in the interface 124. When the interface insert 132, interface 124, cradle top 116, and cradle bottom 120 are aligned with each other as shown in FIG. 2, the interface insert 132 has a hole 206 that aligns with a hole 210 in the interface 124, the hole 158 in the cradle top 116 and the threaded bore 218 in the cradle bottom 112. A fastener 136 such as a bolt or screw is inserted into the holes 206, 210, and 214 and the bore 218 and screwed into the bore 218 to secure the insert 132, interface 124, cradle top 116, and cradle bottom 112 together. The insert 132 of FIGS. 13 and 14 is configured to be rotatably connected and secured to a Wahoo™ style GPS. FIGS. 15 and 16 show an alternative embodiment of the insert 132 that is configured to be rotatably connected and secured to a Garmin™ style GPS.

Figure 17:
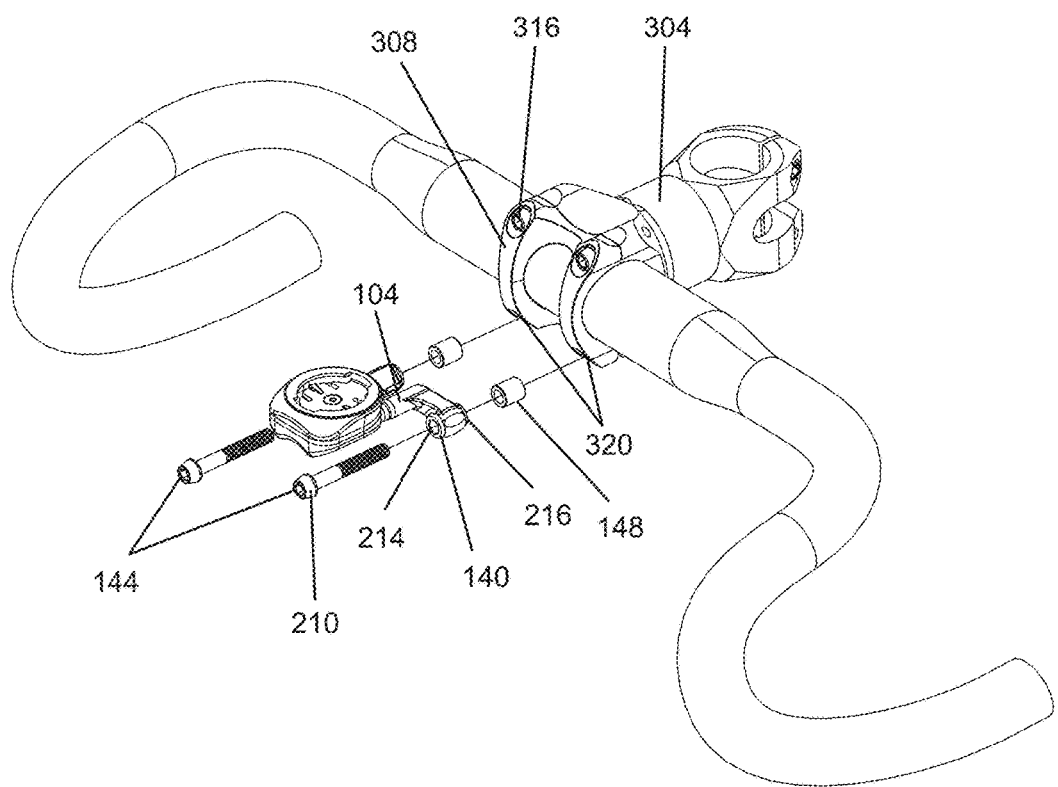
FIG. 17 is a partially exploded isometric view of the mount of FIGS. 1A-1H and a bicycle stem.

In operation, and with reference to FIGS. 2 and 17, the mount 100 can be connected to a bike stem 300 as follows. The first portions 106 of the offset arms 104 are inserted a desired depth into the grooves 162 of the cradle bottom 112. The rims 118 of the arms 104 are positioned in parallel slots 166 in the grooves 162 so that the arms 104 both extend out of the cradle bottom 112 the same amount. The engagement between the slots 166 and the rims 118 helps prevent the arms 104 from moving in the grooves 162. The cradle top 116 is then placed on top of the cradle bottom 112 and the portions of the offset arms 104 that are positioned in the grooves 162. The grooves 160 on the bottom of the cradle top 116 fit over those portions of the offset arms 104 positioned in the grooves 162. The interface 124 is then positioned on top of the cradle top 116. The cradle bottom 112, cradle top 116, and interface 124 can then be secured to each other by the fasteners 120 as discussed above such that the arms 104 are tightly sandwiched and secured between the cradle top 116 and cradle bottom 112. The arms 104, however, can still rotate within the grooves 160, 162, and therefore, can rotate with respect to the assembled cradle 108. In an alternative embodiment, the cradle top 116 and interface 124 can be an integral piece with bores configured to receive the fasteners 120 to connect the single cradle top/interface piece to the cradle bottom 112 with the arms 104 sandwiched therebetween.

The insert 132 can then be mounted to the interface 124 as discussed above, and the fastener 136 can be used to secure the insert 132 to the interface 124, cradle top 116, and cradle bottom 112. An electronic device, such as a GPS, camera, light, or smart phone, can then be detachably connected to the insert 132 as discussed above or can be connected to the insert 132 after the mount 100 is connected to the stem 300. The user can then remove either the top row or bottom row of bolts 316 that secure the face plate 308 of the bicycle stem 300 to the body 304 of the stem 300. The user then inserts fasteners 144 through the steel support sleeves 140 of the offset arms 104 until the heads 210 of the fasteners 144 engage a first side 214 of the sleeves 140. The spacers 148 may then be slid along the fasteners 144 until they engage the other sides 216 of the sleeves 140. The offset arms 104 can then be rotated with respect to the cradle 108 and each other until each arm 104 is aligned with one of the two bores 320 of the stem 300 from which the lower bolt 316 set was removed.

Once each arm 104 is aligned with a bore 320, the user can then screw the fasteners 144 into the stem bores until the spacers 148 engage the stem faceplate 308 and the mount 100 is secured to the stem 300. Accordingly, the mount 100 can be adjusted to fit many different kinds of bicycle stems that have different bolt spreads. In that regard, the rotatable nature of the offset arms 104 allows the arms 104 to be moved to line up with stem bores that are spaced differently depending on the bicycle maker. Moreover, the cradle 108 spaces the arms 104 from each other such that the arms 104 can be rotated toward or away from each other as necessary to fit a wide range of stem bolt spreads.

The user can also adjust the position of the cradle 108 linearly forward and backward with respect to the stem 300 by removing the fasteners 120 that connect the cradle top 116 and cradle bottom 112 and repositioning the offset arms 104 at different locations in the grooves 160, 162 of the cradle bottom 112 and cradle top 116. For example, with respect to FIG. 2, the offset arms 104 could be inserted deeper into the grooves 162 (i.e., further to the left) so that the cradle 108, when reassembled with the fasteners 120 and 136, is closer to the stem of the bicycle. Alternatively, the offset arms 104 could be inserted less deeply into the grooves 162 (i.e., further to the right) so that the cradle 108, when reassembled with the fasteners 120 and 136, is further from the stem of the bicycle. After the arms 104 have been moved to a desired position in the grooves 160, 162, the fasteners 120 can be used to re-secure the cradle bottom 112 to the cradle top 116.

Alternatively, the fasteners 144 can be inserted into the sleeves 140 in the opposite direction as that shown in FIGS. 1-4 and 17 such that the heads 210 of the fasteners 144 engage the second sides 218 of the sleeves 140. The spacers 148 can then be inserted along the fasteners 144 on the other side of the sleeves 140 until the spacers 148 engage the first sides 214 of the sleeves 140. The mount 100 can then be connected to the stem 300 in a manner similar to that discussed above such that it extends "backwards" over the top of the stem 300 if inserted into the bores of the upper set of stem bolts or "backwards" under the bottom of the stem 300 if inserted into the bores of the lower set of stem bolts.

Accordingly, the mount 100 can be adjusted to be mounted to a variety of bicycles made by different manufacturers in a variety of different ways. Indeed, the mount 100 can be adjusted to move forward and backward with respect to the stem to a desired location. The mount 100 also can be mounted in front of, on top of, or below the stem, depending on the preference of the user. The mount 100 is not mounted on the handlebars, so it does not take up valuable space on the handlebars. Also, due to its compact and streamline shape, the mount 100 is aesthetically pleasing and does not take up much space in front of or on top of or below the stem 300.

Thus, the adjustable mount of the various embodiments offers the ability to mount directly to virtually any 4 bolt bicycle stem by utilizing the upper or lower pair of bolts of the stem for connection regardless of the spread between bolts. This can be done because the offset axis arms of the mount can rotate, and, thus, adjust to the varying distance between bolt centers among the many stem manufacturers. This is in contrast to existing stem mounts that are configured for connection to the stems of specific brands and models (and in particular to connect to stem bolt bores that have a spread that is specific to a particular stem maker). As the distance between the bolts of different stem makers vary, such existing mounts typically cannot be used with more than one brand of stem. In addition, the mount of various embodiments also offers fore and aft adjustability.

While endeavoring in the foregoing specification to draw attention to those features of the invention believed to be of particular importance it should be understood that the Applicant claims protection in respect of any patentable feature or combination of features hereinbefore referred to and/or shown in the drawings whether or not particular emphasis has been placed thereon. In addition, while particular elements, embodiments and applications of the present invention have been shown and described, it will be understood that the invention is not limited thereto since modifications can be made by those skilled in the art without departing from the scope of the present disclosure, particularly in light of the foregoing teachings.

The invention claimed is:

1. An electronic device mount for a bicycle, comprising:
   a pair of arms, wherein each arm is configured to receive a first fastener;
   a cradle that receives and retains the arms, wherein each arm can rotate with respect to the cradle, wherein the cradle includes a cradle bottom and a cradle top and a portion of each arm is secured between the cradle bottom and the cradle top, wherein the cradle bottom and cradle top are detachably secured to each other by a second fastener, wherein the cradle top has a first groove and a second groove and the cradle bottom has a third groove and a fourth groove, wherein the first groove is aligned with the third groove and the second groove is aligned with the fourth groove and, when the cradle bottom and cradle top are secured to each other, a portion of one of the arms is rotatably secured in the first and third grooves and a portion of the other arm is rotatably secured in the second and fourth grooves;
   an interface connected to the cradle that is configured to be detachably connected to an electronic device;
   wherein the arms are rotatable such that each arm aligns with a bore on a bicycle stem and each arm is connected to the stem by securing the first fasteners in the bores of the bicycle stem.

2. The mount of claim 1, wherein each of the third and fourth grooves has a slot and each arm has a rim, wherein the rim of each arm fits in one of the slots in the third and fourth grooves.

3. The mount of claim 1, wherein the each arm includes a first cylindrical portion and a second cylindrical portion that are offset from each other by an extension.

4. The mount of claim 3, wherein each second cylindrical portion includes a sleeve that receives the first fastener.

5. The mount of claim 1, further including a spacer that is configured to receive the first fastener and be located between one of the arms and the stem.

6. The mount of claim 1, further including an insert, wherein the interface has a recess that receives the insert and the insert is configured to be rotatably locked to an electronic device.

7. The mount of claim 1, wherein the cradle has a bottom connection portion that is configured to rotatably connect to a second electronic device.

8. An electronic device mount for a bicycle, comprising:
   a pair of arms, wherein the each arm includes a first portion and a second portion that are offset from each other by an extension and each second portion is configured to receive a first fastener;
   a cradle that receives and retains the arms, wherein each arm can rotate with respect to the cradle, wherein the cradle includes a cradle bottom and a cradle top and a portion of each arm is secured between the cradle bottom and the cradle top, wherein the cradle bottom and cradle top are detachably secured to each other by a second fastener, wherein the cradle top has a first groove and a second groove and the cradle bottom has a third groove and a fourth groove, wherein the first groove is aligned with the third groove and the second groove is aligned with the fourth groove and, when the cradle bottom and cradle top are secured to each other, a portion of one of the arms is rotatably secured in the first and third grooves and a portion of the other arm is rotatably secured in the second and fourth grooves;
   an interface connected to the cradle that is configured to be detachably connected to an electronic device;
   wherein the arms are rotatable such that each arm aligns with a bore on a bicycle stem and each arm is connected to the stem by securing the first fasteners in the bores of the bicycle stem.

9. The mount of claim 8, wherein each of the third and fourth grooves has a slot and each first portion of each arm has a rim, wherein the rim of each first portion of each arm fits in one of the slots in the third and fourth grooves.

10. The mount of claim 8, wherein each second portion of each arm includes a sleeve that receives the first fastener.

* * * * *